(12) United States Patent
Gore et al.

(10) Patent No.: US 8,553,822 B2
(45) Date of Patent: Oct. 8, 2013

(54) TIME FILTERING FOR EXCESS DELAY MITIGATION IN OFDM SYSTEMS

(75) Inventors: Dhananjay Ashok Gore, San Diego, CA (US); Ashok Mantravadi, San Diego, CA (US); Fuyun Ling, San Diego, CA (US); Krishna Kiran Mukkavilli, San Diego, CA (US); Raghuraman Krishnamoorthi, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 11/022,513

(22) Filed: Dec. 22, 2004

(65) Prior Publication Data

US 2005/0163258 A1    Jul. 28, 2005

Related U.S. Application Data

(60) Provisional application No. 60/540,087, filed on Jan. 28, 2004.

(51) Int. Cl.
    *H04B 1/10*    (2006.01)
(52) U.S. Cl.
    USPC .......................................... 375/350; 375/224
(58) Field of Classification Search
    USPC ................. 375/340, 224, 229, 285, 227, 350, 375/346; 370/241, 252, 491, 500, 291
    See application file for complete search history.

(56) References Cited

U.S. PATENT DOCUMENTS

| | | | |
|---|---|---|---|
| 5,303,263 A * | 4/1994 | Shoji et al. ..................... 375/229 |
| 5,488,635 A * | 1/1996 | Chennakeshu et al. ....... 375/340 |
| 5,732,113 A | 3/1998 | Schmidl et al. |
| 5,867,478 A | 2/1999 | Baum et al. |
| 6,473,418 B1 | 10/2002 | Laroia et al. |
| 6,654,428 B1 | 11/2003 | Bose et al. |
| 6,654,429 B1 | 11/2003 | Li |
| 6,654,728 B1 | 11/2003 | Li et al. |
| 6,684,173 B2 | 1/2004 | Kessenich et al. |
| 6,954,481 B1 | 10/2005 | Laroia et al. |
| 7,012,882 B2 | 3/2006 | Wang et al. |
| 7,020,226 B1 | 3/2006 | Kirkland |
| 7,049,404 B2 | 5/2006 | Mao et al. |
| 7,139,331 B2 | 11/2006 | Kolze |

(Continued)

FOREIGN PATENT DOCUMENTS

| | | |
|---|---|---|
| EP | 0 938 208 A1 | 8/1999 |
| EP | 1320232 | 6/2003 |

(Continued)

OTHER PUBLICATIONS

Ryu et al, "Comparison of two FFT structures for Fractionally-spaced frequency domain Equalizer", May 6, 2002, pp. 1710-1713.

(Continued)

*Primary Examiner* — Jean B Corrielus
(74) *Attorney, Agent, or Firm* — Fulbright & Jaworski LLP

(57) ABSTRACT

Pilot transmission and channel estimation techniques for an OFDM system with excess delay spread are described. To mitigate the deleterious effects of excess delay spread, time filtering is utilized. Time filtering is utilized to combat excess delay spread effects in channel estimation. The time filtering is performed in the presence of staggered pilots and helps in improving the channel estimate in the presence of excess delay spread.

20 Claims, 8 Drawing Sheets

(56) References Cited

U.S. PATENT DOCUMENTS

| | | |
|---|---|---|
| 7,180,965 B2 | 2/2007 | Eilts et al. |
| 7,200,190 B2 | 4/2007 | Malette et al. |
| 7,324,606 B2 | 1/2008 | Eilts et al. |
| 7,339,999 B2 | 3/2008 | Gore et al. |
| 7,352,821 B2 | 4/2008 | Kannan et al. |
| 7,457,231 B2 | 11/2008 | Vijayan et al. |
| 7,660,275 B2 | 2/2010 | Vijayan et al. |
| 7,907,593 B2 | 3/2011 | Vijayan et al. |
| 8,027,399 B2 | 9/2011 | Gore et al. |
| 2001/0043578 A1 | 11/2001 | Kumar et al. |
| 2003/0058787 A1 | 3/2003 | Vandenameele-Lepla |
| 2004/0071221 A1 | 4/2004 | Nakada et al. |
| 2004/0264604 A1* | 12/2004 | Malette et al. ............... 375/340 |
| 2005/0063298 A1 | 3/2005 | Ling et al. |
| 2005/0135308 A1 | 6/2005 | Vijayan et al. |
| 2005/0135509 A1 | 6/2005 | Mantravadi et al. |
| 2005/0170783 A1 | 8/2005 | Krishnan et al. |
| 2006/0269009 A1 | 11/2006 | Krishnan et al. |
| 2008/0152033 A1 | 6/2008 | Gore et al. |
| 2008/0285670 A1 | 11/2008 | Walton et al. |
| 2010/0215115 A1 | 8/2010 | Ketchum et al. |
| 2010/0246642 A1 | 9/2010 | Walton et al. |

FOREIGN PATENT DOCUMENTS

| | | |
|---|---|---|
| JP | 2000068975 A | 3/2000 |
| JP | 2001069119 | 3/2001 |
| JP | 2002009724 A | 1/2002 |
| JP | 2003032217 A | 1/2003 |
| JP | 2003101503 A | 4/2003 |
| JP | 2003134086 A | 5/2003 |
| JP | 2004007353 A | 1/2004 |
| JP | 2004134883 A | 4/2004 |
| JP | 2006518971 A | 8/2006 |
| TW | 481953 | 4/2002 |
| WO | WO 98/00946 | 1/1998 |
| WO | 02065685 A1 | 8/2002 |
| WO | 2004040813 A1 | 5/2004 |
| WO | 2004040827 A2 | 5/2004 |
| WO | 2004056022 A2 | 7/2004 |
| WO | WO2004100413 A1 | 11/2004 |
| WO | WO2005022811 A2 | 3/2005 |

OTHER PUBLICATIONS

Kim et al, "Residual ISI cancellation for OFDM with applications to HDTV Broadcasting", Oct. 1988, pp. 1590-1599.

Hutter, A. et al: "Channel Estimation for Mobile OFDM Systems" Vehicular Technology Conference, 1999. VAC 1999—Fall. IEEE VTS 50th Amsterdam, Netherlands Sep. 19-22, 1999, pp. 305-309, XP010352881 ISBN: 0-7803-5435-4.

Mostofi, Y, et al.: "Effect of Frame Synchronization Errors on Pilot-Aided Channel Estimation in OFDM: Analysis and Solution" Wireless personal Multimedia Communications, 2002. The 5th International Symposium on Oct. 27-30, 2002, Piscataway, NJ, USA, IEEE.

Sandell, et al: "A Comparative Study of Pilot-Based Channel Estimators for Wireless OFDM" Research Report Tulea, Division of Signal Processing, No. 19, Sep. 1, 1996.

International Search Report, PCT/US2005/001588—International Search Authority—European Patent Office, Jun. 16, 2005.

Written Opinion, PCT/US2005/001588—International Search Authority—European Patent Office, Jun. 16, 2005.

Kim, Dukhyun et al.: "Residual ISI Cancellation for OFDM with Applications to HDTV Broadcasting," IEEE Journal on Selected Areas in Communications, vol. 16, No. 8, pp. 1590-1599 Oct. 1998, XP002159671.

Jae-Ho Ryu et al. "Comparison of Two FFT Structures for Fractionally-Spaced Frequency Domain Equalizer." VTC Spring 2002. IEEE 55th. Vehibular Technology Conference, New York, NY: IEEE, US, vol. 1 of 4. Conf. 55, May 6, 2002, pp. 1710-1713.

European Standard (Telecommunications series), "Digital Video Broadcasting (DVB); Framing structure, channel coding and modulation for digital terrestrial television", ETSI EN 300 744 v1.4.1 (Jan. 2001), section 4.5.3.

* cited by examiner

TIME FILTERING FOR EXCESS DELAY MITIGATION IN OFDM SYSTEMS

CLAIM OF PRIORITY UNDER 35 U.S.C. §119

The present Application for Patent claims priority to Provisional Application No. 60/540,087 entitled "TIME FILTERING FOR EXCESS DELAY MITIGATION IN OFDM SYSTEMS" filed Jan. 28, 2004, and assigned to the assignee hereof and hereby expressly incorporated by reference herein.

REFERENCE TO CO-PENDING APPLICATIONS FOR PATENT

The present Application for Patent is related to the following co-pending U.S. Patent Applications:

U.S. Pat. Ser. No. 10/821,706, entitled "Pilot Transmission and Channel Estimation for an OFDM System with Excess Delay Spread" filed Apr. 9, 2004 assigned to the assignee hereof, and expressly incorporated by reference herein; and U.S. Pat. Ser. No. 10/926,884 entitled "Staggered Pilot Transmission for Channel Estimation and Time Tracking" filed Aug. 25, 2004, assigned to the assignee hereof and expressly incorporated by reference herein.

BACKGROUND

I. Field

The present invention relates generally to data communication, and more specifically to time filtering for excess delay mitigation in orthogonal frequency division multiplexing (OFDM) systems.

II. Background

OFDM is a multi-carrier modulation technique that effectively partitions the overall system bandwidth into multiple ($N_F$) orthogonal subbands. These subbands are also referred to as tones, subcarriers, bins, and frequency channels. With OFDM, each subband is associated with a respective subcarrier that may be modulated with data. Up to $N_F$ modulation symbols may be transmitted on the $N_F$ subbands in each OFDM symbol period. Prior to transmission, these modulation symbols are transformed to the time-domain using an $N_F$-point inverse fast Fourier transform (IFFT) to obtain a "transformed" symbol that contains $N_F$ chips.

OFDM can be used to combat frequency selective fading, which is characterized by different channel gains at different frequencies of the overall system bandwidth. It is well known that frequency selective fading causes intersymbol interference (ISI), which is a phenomenon whereby each symbol in a received signal acts as distortion to one or more subsequent symbols in the received signal. The ISI distortion degrades performance by impacting the ability to correctly detect the received symbols. Frequency selective fading can be conveniently combated with OFDM by repeating a portion of each transformed symbol to form a corresponding OFDM symbol. The repeated portion is commonly referred to as a cyclic prefix.

The length of the cyclic prefix (i.e., the amount to repeat for each OFDM symbol) is dependent on delay spread. The delay spread of a wireless channel is the time span or duration of an impulse response for the wireless channel. This delay spread is also the difference between the earliest and latest arriving signal instances (or multipaths) at a receiver for a signal transmitted via the wireless channel by a transmitter. The delay spread of an OFDM system is the maximum expected delay spread of the wireless channels for all transmitters and receivers in the system. To allow all receivers in the system to combat ISI, the cyclic prefix length should be equal to or longer than the maximum expected delay spread. However, since the cyclic prefix represents an overhead for each OFDM symbol, it is desirable to have the cyclic prefix length be as short as possible to minimize overhead. As a compromise, the cyclic prefix length is typically selected such that the cyclic prefix contains a significant portion of all multipath energies for most receivers in the system.

An OFDM system can withstand a delay spread that is smaller than or equal to the cyclic prefix length. When this is the case, the $N_F$ subbands are orthogonal to one another. However, a given receiver in the system may observe excess delay spread, which is a delay spread that is greater than the cyclic prefix length. Excess delay spread can cause various deleterious effects, such as ISI and channel estimation errors, both of which can degrade system performance as described below. There is therefore a need in the art for techniques to mitigate the deleterious effects of excess delay spread in an OFDM system.

SUMMARY

Techniques for transmitting pilot and estimating the response of a wireless channel with excess delay spread are described herein.

In an aspect, a method of estimating a channel in a wireless communication system comprises obtaining at least two groups of received pilot symbols for at least two sets of pilot subbands, one group of received pilot symbols for each set of pilot subbands, wherein a second group is staggered with respect to a first group, dividing received pilot symbols into even symbols and odd symbols, wherein the even symbols include actual and excess components and the odd symbols include actual and excess components, determining an even effective estimate and an odd effective estimate based on the even symbols and the odd symbols, respectively, selecting a first set of time-filter coefficients for estimating an actual channel, selecting a second set of time-filter coefficients for estimating an excess channel, time-filtering for an actual channel based on at least the even effective estimate, the odd effective estimate, the first set of time-filter coefficients and the second set of time-filter coefficients, and time-filtering for an excess channel based on at least the even effective estimate, the odd effective estimate, the first set of time-filter coefficients and the second set of time-filter coefficients.

In another aspect an apparatus in a wireless communication system comprising means for obtaining at least two groups of received pilot symbols for at least two sets of pilot subbands, one group of received pilot symbols for each set of pilot subbands, wherein a second group is staggered with respect to a first group, means for dividing received pilot symbols into even symbols and odd symbols, wherein the even symbols include actual and excess components and the odd symbols include actual and excess components, means for determining an even effective estimate and an odd effective estimate based on the even symbols and the odd symbols, respectively, means for selecting a first set of time-filter coefficients for estimating an actual channel, means for electing a second set of time-filter coefficients for estimating an excess channel, means for time-filtering for an actual channel based on at least the even effective estimate, the odd effective estimate, the first set of time-filter coefficients and the second set of time-filter coefficients, and means for time-filtering for an excess channel based on at least the even effective estimate, the odd effective estimate, the first set of time-filter coefficients and the second set of time-filter coefficients.

In yet another aspect, a computer readable media embodying a method for estimating a channel in a wireless communication system comprising obtaining at least two groups of received pilot symbols for at least two sets of pilot subbands, one group of received pilot symbols for each set of pilot subbands, wherein a second group is staggered with respect to a first group, dividing received pilot symbols into even symbols and odd symbols, wherein the even symbols include actual and excess components and the odd symbols include actual and excess components, determining an even effective estimate and an odd effective estimate based on the even symbols and the odd symbols, respectively, selecting a first set of time-filter coefficients for estimating an actual channel, selecting a second set of time-filter coefficients for estimating an excess channel, time-filtering for an actual channel based on at least the even effective estimate, the odd effective estimate, the first set of time-filter coefficients and the second set of time-filter coefficients, and time-filtering for an excess channel based on at least the even effective estimate, the odd effective estimate, the first set of time-filter coefficients and the second set of time-filter coefficients.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The techniques described herein for time filtering for excess delay mitigation may be used for various communication systems such as an orthogonal frequency division multiplexing (OFDM)-based system, an Orthogonal Frequency Division Multiple Access (OFDMA) system, a Code Division Multiple Access (CDMA) system, a Time Division Multiple Access (TDMA) system, a Frequency Division Multiple Access (FDMA) system, a single-input single-output (SISO) system, a multiple-input multiple-output (MIMO) system, and so on.

In an OFDM system, a cyclic prefix is inserted at the beginning of each OFDM symbol to remove interference across successive symbols. When the delay spread of the channel is less than the cyclic prefix and the receiver is synchronized to choose the appropriate FFT window, there is no inter-symbol interference (ISI) between successive OFDM symbols. Further, linear convolution with the channel impulse response is converted to a circular convolution, and the orthogonality of the carriers is preserved. In other words, there is no inter-carrier interference (ICI) between different carriers within the same OFDM symbol.

When the delay spread of the channel exceeds the cyclic prefix, there is ICI as well as ISI, and this could degrade the performance of the OFDM system. Increasing the length of the cyclic prefix to avoid this degradation could lead to an unacceptable overhead in the system. In addition to the introduction of ICI/ISI, the presence of excess delay spread could lead to further degradation in a coherent receiver that needs to estimate the channel. Specifically, if the number of channel taps has increased and the pilot resources allocated for channel estimation could be insufficient. Clearly, the degradation in such a scenario would depend on the allocated resources as well as the amount of excess delay spread.

As with the cyclic prefix, increasing the resources for channel estimation may lead to an unacceptable increase in overhead. Degradation in channel estimation could be quite significant in some scenarios of practical interest, overshadowing the intrinsic degradation due to ICI and ISI. Using channel estimation techniques that account for the presence of excess delay spread mitigate such effects.

Figure 1:
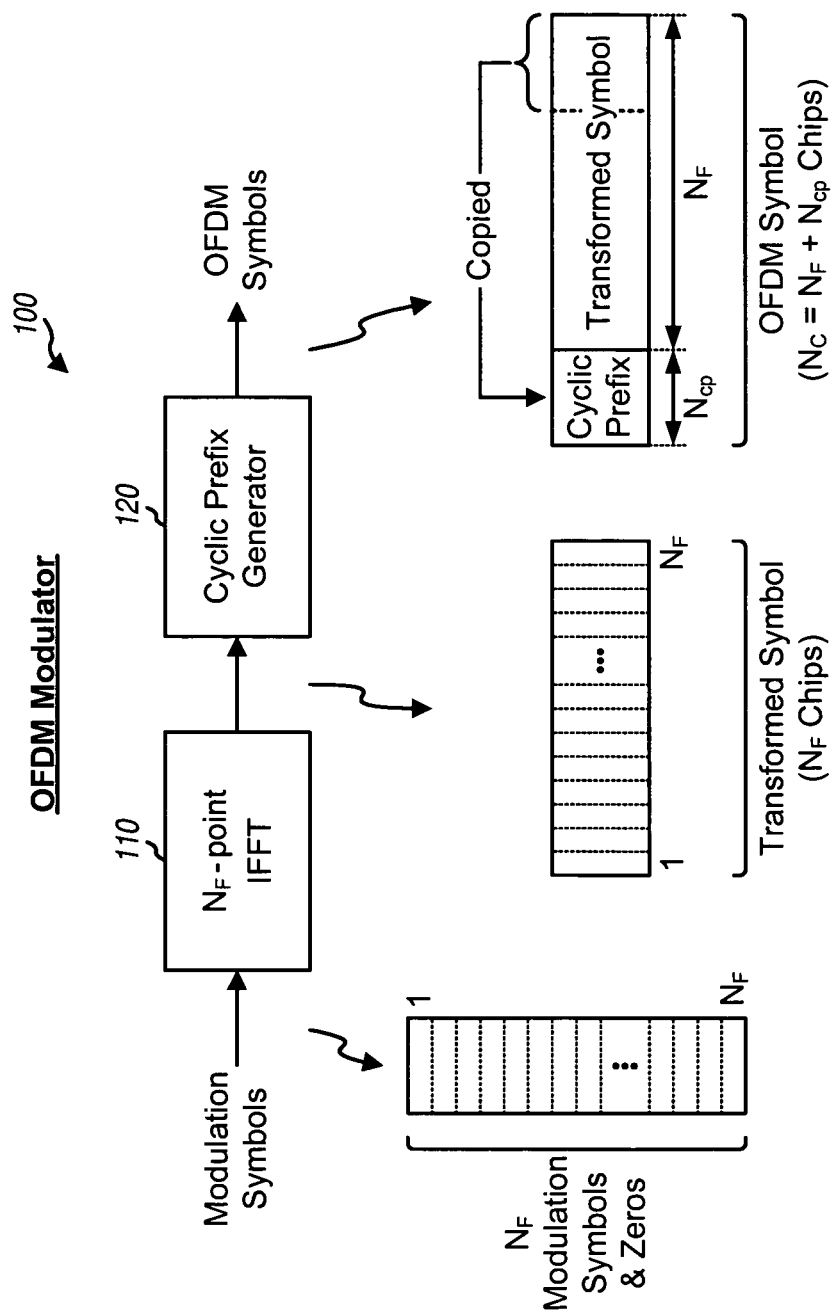
FIG. 1 shows an OFDM modulator for an OFDM system.

FIG. 1 shows a block diagram of an OFDM modulator 100 for an OFDM system. The data to be transmitted is typically encoded and interleaved to generate code bits, which are then mapped to modulation symbols. The symbol mapping is performed by (1) grouping the code bits into B-bit binary values, where B>1 and (2) mapping each B-bit value to a specific modulation symbol based on a modulation scheme (e.g., M-PSK or M-QAM, where M $=2^B$). Each modulation symbol is a complex value in a signal constellation corresponding to the modulation scheme. For each OFDM symbol period, one "transmit" symbol is sent on each of the $N_F$ subbands. Each transmit symbol can be either a modulation symbol for pilot/data or a signal value of zero (i.e., a "zero symbol"). An IFFT unit 110 performs an $N_F$-point IFFT on the $N_F$ transmit symbols for the $N_F$ total subbands in each OFDM symbol period and provides a transformed symbol that contains $N_F$ chips. The IFFT may be expressed as:

$$\underline{s} = \underline{W}_{N_F \times N_F}^H \underline{S}, \quad \text{(Equation 1)}$$

where S is an $N_F \times 1$ vector of transmit symbols for the $N_F$ subbands;

$\underline{W}_{N_F \times N_F}$ is an $N_F \times N_F$ discrete Fourier transform (DFT) matrix;

s is an $N_F \times 1$ vector of time-domain chips; and

"H" denotes the conjugate transpose.

The DFT matrix $\underline{W}_{N_F \times N_F}$ is defined such that the (n,m)-th entry, $w_{n,m}$, is given as:

$$w_{n,m} = e^{-j2\pi \frac{(n-1)(m-1)}{N_F}}, \text{ for } n = \{1 \ldots N_F\} \text{ and} \quad \text{(Equation 2)}$$

$$m = \{1 \ldots N_F\},$$

where n is a row index and m is a column index. $\underline{W}_{N_F \times N_F}^H$ is an inverse DFT matrix.

A cyclic prefix generator 120 repeats a portion of each transformed symbol to obtain a corresponding OFDM symbol that contains $N_C$ chips, where $N_C = N_F + N_{cp}$ and $N_{cp}$ is the cyclic prefix length. An OFDM symbol period is the duration of one OFDM symbol, which is $N_C$ chip periods. The chips are conditioned and transmitted via a wireless channel.

Figure 2A:
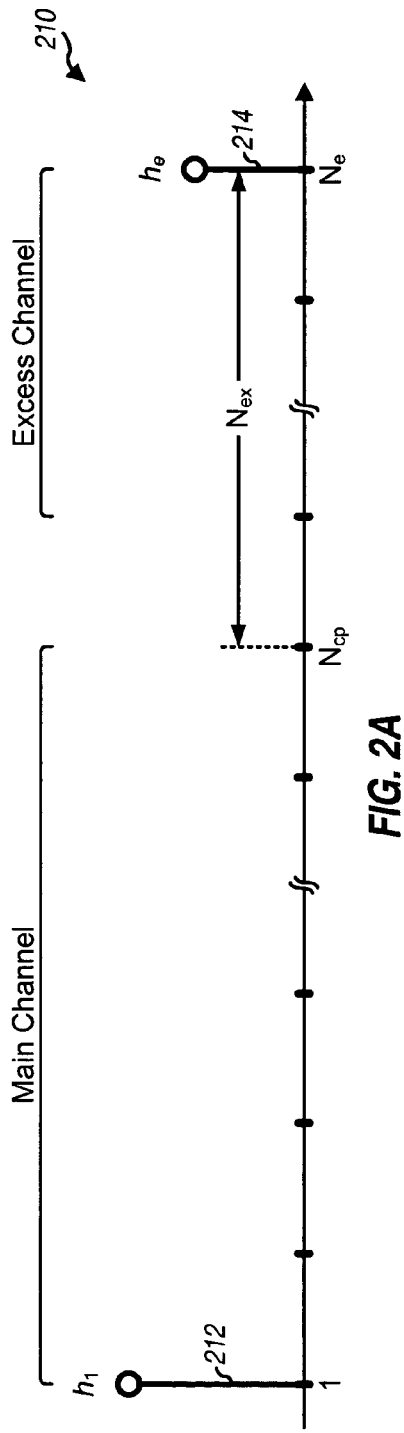
FIGS. 2A and 2D show a wireless channel with excess delay spread and its effective channel, respectively.

FIG. 2A shows an exemplary impulse response 210 of a wireless channel with excess delay spread. Channel impulse response 210 includes two taps 212 and 214 for two multi-paths in the wireless channel. Actual tap 212 has a complex gain of $h_l$ and is located at tap index 1. Excess tap 214 has a complex gain of $h_e$ and is located at tap index $N_e$, which is outside of the cyclic prefix length $N_{cp}$. As used herein, "main channel" refers to the portion of the channel impulse response that is at or within the cyclic prefix length, "excess channel" refers to the portion of the channel impulse response that is outside of the cyclic prefix length, and "excess" refers to the difference between the tap index of an excess channel tap and the cyclic prefix length. For channel impulse response 210, the main channel includes one (actual) tap 212, the excess channel includes one (excess) tap 214, and the excess for tap 214 is $N_{ex}=N_e-N_{cp}$.

Figure 2D:
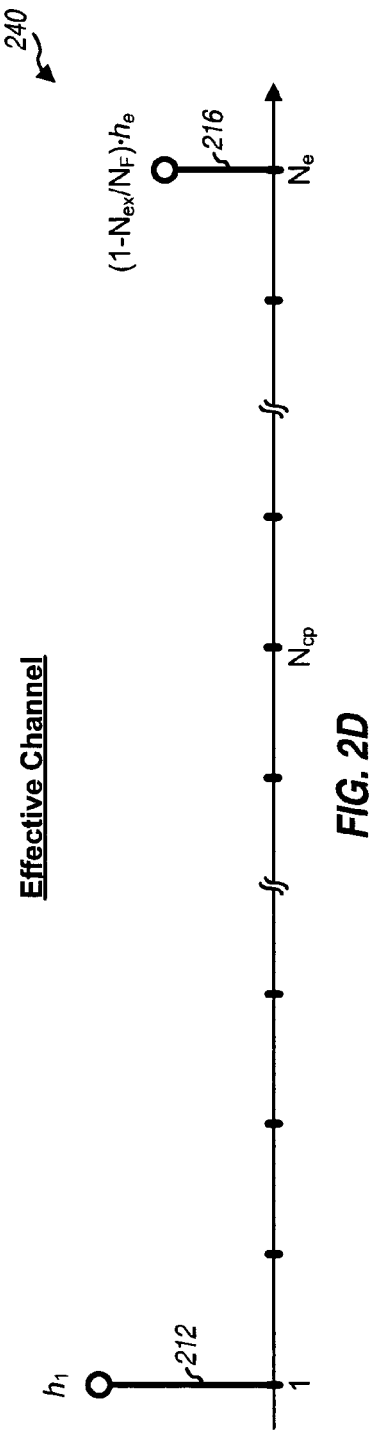
Figure 2B:
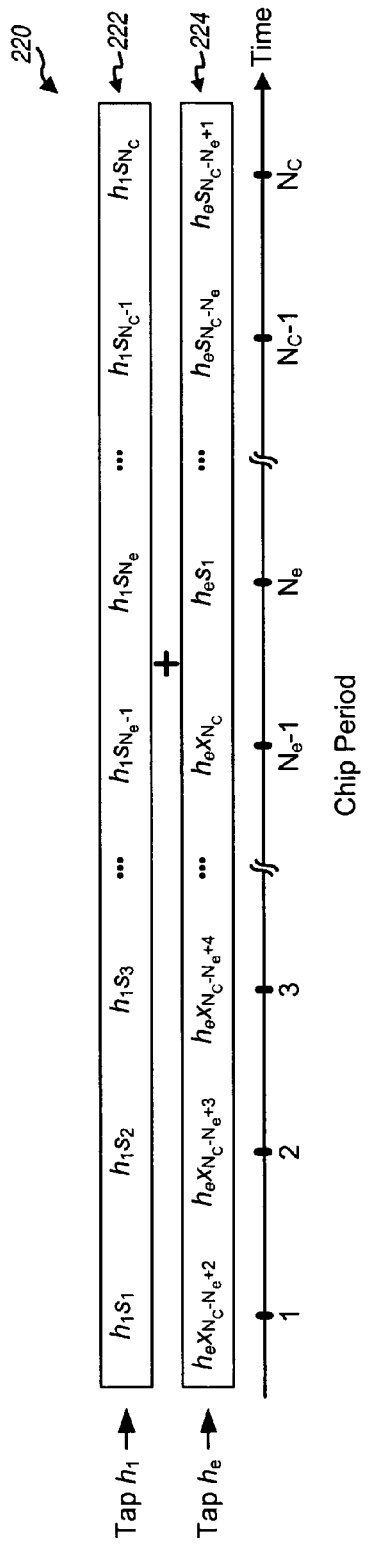
FIGS. 2B and 2C show a sequence of received chips for the wireless channel.

FIG. 2B shows a sequence 220 of received chips for the wireless channel shown in FIG. 2A. Received chip sequence 220 is a convolution of a transmitted chip sequence with taps 212 and 214 for the wireless channel. Received chip sequence 220 is composed of (1) a chip sequence 222 generated by convolving main channel tap 212 with the transmitted chip sequence and (2) a chip sequence 224 generated by convolving excess channel tap 214 with the transmitted chip sequence, where $s_i$ denotes the i-th chip for the current OFDM symbol, $x_i$ denotes the i-th chip for the previous OFDM symbol, and $i=1 \ldots N_C$.

Figure 2C:
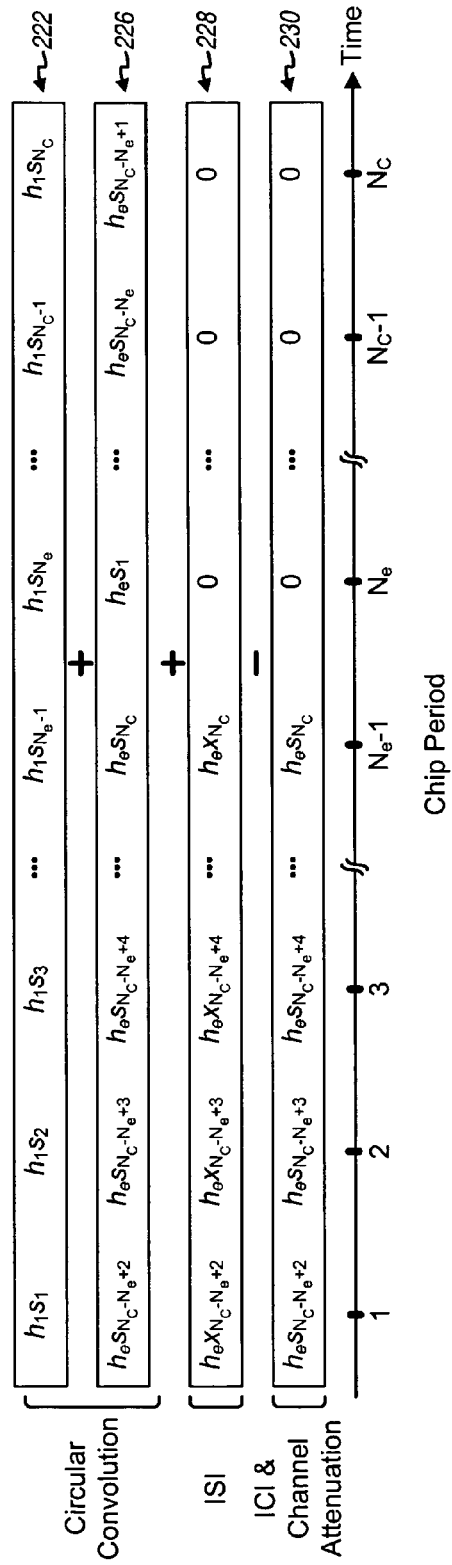

FIG. 2C shows the decomposition of received chip sequence 220 into different components. Chip sequence 224 in FIG. 2B is replaced with (1) a chip sequence 226 generated by a circular convolution of excess channel tap 214 with the $N_C$ chips for the current OFDM symbol, (2) a chip sequence 228 for the tail end of the previous OFDM symbol, and (3) a chip sequence 230 for the tail end of the current OFDM symbol. Chip sequences 222 and 226 represent the sequences that would have been received for taps 212 and 214 if the cyclic prefix length were sufficiently long and tap 214 is part of the main channel. However, since this is not the case, chip sequences 228 and 230 are both due to the excess delay spread. Chip sequence 228 represents the leakage of the previous OFDM symbol into the current OFDM symbol and is the source of intersymbol interference. Chip sequence 230 represents the disturbance to the circular convolution and is the source of intercarrier interference (ICI) and channel attenuation.

The intersymbol interference observed in each subband may be expressed as:

$$ISI(k) = h_e \cdot \underline{W}_{1 \times N_{ex}}(k) \underline{W}_{N_{ex} \times N_F}^H X, \text{ for } k=1 \ldots N_F, \quad \text{(Equation 3)}$$

where X is an $N_F \times 1$ vector of transmit symbols for the previous OFDM symbol;
$\underline{W}_{N_{ex} \times N_F}^H$ is an $N_{ex} \times N_F$ matrix with the last $N_{ex}$ rows of $\underline{W}_{N_F \times N_F}^H$; and
$\underline{W}_{1 \times N_{ex}}(k)$ is a $1 \times N_{ex}$ vector with the first $N_{ex}$ elements of the k-th row of $\underline{W}_{N_F \times N_F}$.

The operation $\underline{W}_{N_{ex} \times N_F}^H X$ generates an $N_{ex} \times 1$ vector $\underline{X}_{N_{ex}}$ that contains the last $N_{ex}$ chips of the previous OFDM symbol. The multiplication of $\underline{X}_{N_{ex}}$ with $\underline{W}_{1 \times N_{ex}}(k)$ generates the interference due to these last $N_{ex}$ chips on subband k.

The noise power on each subband due to intersymbol interference can be expressed as:

$$\sigma_{ISI}^2 = E_S \cdot |h_e|^2 \cdot (N_{ex}/N_F), \text{ for } k=1 \ldots N_F, \quad \text{(Equation 4)}$$

where $E_S$ is the transmit symbol energy, $|h_e|^2$ is the power of the excess channel, and $\sigma_{ISI}^2$ is the noise power due to ISI on each subband. As shown in equation (4), the ISI noise power per subband is (1) proportional to the excess channel energy $|h_e|^2$, (2) proportional to the excess $N_{ex}$, which is indicative of the amount of leakage of the previous OFDM symbol onto the current OFDM symbol, and (3) inversely related to the number of total subbands since the total ISI noise power is distributed over the $N_F$ subbands.

The noise power on each subband due to intercarrier interference can be computed in similar manner as for intersymbol interference and expressed as:

$$\sigma_{ICI}^2 = E_S \cdot |h_e|^2 \cdot [(N_{ex}/N_F) - (N_{ex}/N_F)^2], \text{ for } k=1 \ldots N_F, \quad \text{(Equation 5)}$$

where $\sigma_{ICI}^2$ is the noise power due to ICI on each subband.

FIG. 2D shows an "effective" channel 240 for the wireless channel shown in FIG. 2A. Referring back to FIG. 2C, chip sequence 226 represents the contribution due to excess channel tap 214 (assuming that the cyclic prefix is long enough), and chip sequence 230 represents the source of ICI due to the excess channel. The subtraction operation for chip sequence 230 results partly in a reduction of the signal power for each subband. This subtraction can be accounted for by scaling down excess channel tap 214 by a factor of $(1-N_{ex}/N_F)$. As shown in FIG. 2D, effective channel 240 includes tap 212 having the complex gain of $h_1$ and a tap 216 having a complex gain of $h_e \cdot (1-N_{ex}/N_F)$. The reduction in the gain of tap 216 relative to the gain of tap 214 is referred to as "channel attenuation" and results from excess delay spread for tap 214. The amount of attenuation is related to the excess $N_{ex}$.

A receiver performs channel estimation in order to derive a channel estimate for the wireless channel. Channel estimation is typically performed based on pilot symbols, which are modulation symbols that are known a priori by the receiver. The pilot symbols may be transmitted in various manners as described below.

Figure 3:
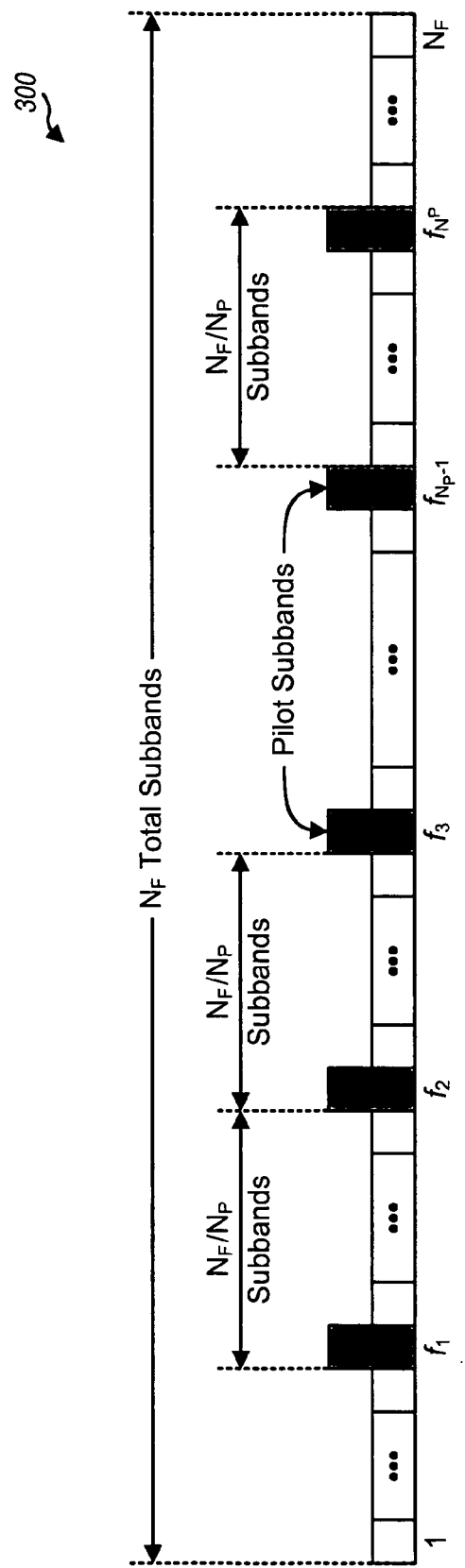
FIG. 3 shows a subband structure that may be used for the OFDM system.

FIG. 3 shows an exemplary subband structure that may be used for the OFDM system. The OFDM system has an overall system bandwidth of BW MHz, which is partitioned into $N_F$ orthogonal subbands using OFDM. Each subband has a bandwidth of $BW/N_F$ MHz. For a spectrally shaped OFDM system, only $N_U$ of the $N_F$ total subbands are used for data/pilot transmission, where $N_U < N_F$, and the remaining $N_F - N_U$ subbands are not used for data/pilot transmission and serve as guard subbands to allow the system to meet spectral mask requirements. For simplicity, the following description assumes that all $N_F$ subbands may be used in the OFDM system.

For the sake of illustration, an OFDM system is considered where channel estimation is based on uniformly spaced pilots in the frequency domain. The $k^{th}$ received OFDM symbol in the frequency domain can be written as $$Y(k) = H(k) + w(k) = W_{P,D} h(k) + w(k) \quad \text{(Equation 6)}$$

where
P is the number of pilots carriers, and D is the number of channel taps assumed by the receiver,
the vectors Y, H, w are of length P and the noise w is white complex Gaussian with variance $N_0$.
the matrix $W_{P,D}$ is the P×D sub-matrix of the unnormalized DFT matrix $$W_{N,N}(m, n) = \exp\left(-j\frac{2\pi mn}{N}\right)$$

where N is the total number of subcarriers.

The number of channel taps $D \leq P$. However, in an embodiment a longer channel estimate for dealing with scenarios where the channel has a delay spread larger than the cyclic prefix. To get a longer channel estimate, pilots are staggered across successive OFDM symbols, i.e., the pilot carrier indices are changed in successive OFDM symbols as described below.

Staggered Pilots

For simplicity, assuming a two symbol staggering pattern: if the uniformly spaced pilot carriers are of the form $$\frac{N}{P}n + n_0$$

in the even symbols, they would be $$\frac{N}{P}n + n_0 + \frac{N}{2P}$$

in the odd symbols. With such staggering, we can get an estimate of up to a length $2P$ by using the pilot observations from two neighboring OFDM symbols. Specifically, assume a channel with $2P$ time domain taps. Then $$H_p(2k) = \sum_{l=0}^{2P-1} h_l(2k) e^{-j\frac{2\pi l[(N/P)p-n_0]}{N}}$$

$$= \sum_{l=0}^{2P-1} h_l(2k) e^{-j\frac{2\pi lp}{P}} e^{-j\frac{2\pi n_0 l}{N}}$$

$$= \sum_{l=0}^{P-1} \left[ h_l(2k) + e^{-j\frac{2\pi P n_0}{N}} h_{l+P}(2k) \right] e^{-j\frac{2\pi lp}{P}} e^{-j\frac{2\pi n_0 l}{N}}$$

For further simplicity, set $n_0=0$, so that the staggering is between phases 0 and $$\frac{N}{2P},$$

though the above expression can be carried through for any $n_0$. We then have $$H_p(2k) = \sum_{l=0}^{P-1} [h_l(2k) + h_{l+P}(2k)] e^{-j\frac{2\pi lp}{P}}$$

Similarly, for the odd symbols, $$H_p(2k+1) = \sum_{l=0}^{2P-1} h_l(2k+1) e^{-j\frac{2\pi l[(N/P)p+(N/2P)]}{N}}$$

$$= \sum_{l=0}^{P-1} [h_l(2k+1) + h_{l+P}(2k+1)] e^{-j\frac{\pi l}{P}} e^{-j\frac{2\pi lp}{P}}$$

Thus the pilot observations in the even and odd symbols can be written as $$Y(2k) = W_{P,P}[h^a(2k) + h^e(2k)] + w(2k)$$

$$Y(2k+1) = W_{P,P}\Lambda[h^a(2k+1) - h^e(2k+1)] + w(2k+1) \quad \text{(Equation 2)}$$

where $$\Lambda = \text{diag}\left\{ e^{-j\frac{\pi l}{P}} \right\}_{l=0}^{D-1}$$

and the susperscripts "a" and "e" denote the "actual" and "excess" taps that correspond to $l=0, \ldots, P-1$ and $l=P, \ldots, 2P-1$, respectively.

Actual tap and excess tap are as discussed above and as shown in, for example, FIG. 2A, where actual tap 212 and excess tap 214 are shown. "Excess" refers to the difference between the tap index of an excess channel tap and the cyclic prefix length. For a channel impulse response, the main channel includes one actual tap and the excess channel includes one excess tap, and the excess for the excess tap is $N_{ex}=N_e-N_{cp}$.

To get an estimate of the channel from the observations in Equation 7, one possibility is to use a least-squares approach to estimate the effective time-domain channel. Equation 8 shows an even effective estimate and an odd effective estimate:

$$\hat{h}(2k) = W_{P,P}^H Y(2k)$$

$$\hat{h}(2k+1) = \Lambda^{-1} W_{P,P}^H Y(2k+1) \quad \text{(Equation 8)}$$

The effective estimates above include both actual and excess components. A simple way to get the full $2P$ tap channel estimate is $$\hat{h}^a = \frac{\hat{h}(2k) + \hat{h}(2k+1)}{2} \quad \text{(Equation 9)}$$

$$\hat{h}^e = \frac{\hat{h}(2k) - \hat{h}(2k+1)}{2}$$

Equation 9 is just a special case of a more general operation where the time-domain estimates in Equation 8 (obtained every OFDM symbol) are averaged across multiple OFDM symbols. Such averaging is referred to as time-filtering, and it is done separately for each individual time-domain tap. The resulting estimate of tap 1 at any OFDM symbol m (odd or even) can be written as $$\overline{h}_l(2k) = \sum_{n=-N_f}^{N_b-1} \alpha_{n,l} \overline{h}_l(2k-n)$$

where $N_f$ and $N_b$ are the number of non-causal and causal taps, respectively.

In this framework, Equation 9 corresponds to choosing $N_f=0$, $N_b=2$ and $$\alpha_{0,l} = \alpha_{1,l} = 0.5, \ l < P$$

$$\alpha_{0,l} = 0.5 \text{ and } \alpha_{1,l} = -0.5 \ P \leq l < 2P-1$$

Thus, one set of time-filter coefficients is chosen for estimating the actual channel (l<P) and another set is chosen for the excess channel.

Consider more general strategies for choosing the time-filter coefficients for the two halves. For clarity, the filter co-efficients for l<P is denoted by $\alpha_n$ and the filter coefficients for l≥P is denoted by $\beta_n$.

Time-Filtering for the Actual Channel

Apart from separating the actual and excess channels, the choice of time-filter coefficients are governed by other constraints as well. Time-filtering enables the capture of additional pilot energy and improvement in the reliability of channel estimates. However, using a long time-filter can introduce degradations due to time-variations of the channel.

For the sake of illustration, focus on the observed $l^{th}$ time-domain channel tap in an even OFDM symbol, and assume that channel vales linearly over the $N_f+N_b$ symbols that are used by the tine filter. Using Equation 8, we have $$h_l(2k-n) = h_l^{actual}(2k-n) + (-1)^n h_l^{excess}(2k), l=0, \ldots, P-1$$

and $$h_l^a(2k-n) = h_l^a(2k) - n\delta_a$$

$$h_l^e(2k-n) = h_l^e(2k) - n\delta_e, n=N_b-1, \ldots, -N_f$$

where $\delta_a$ and $\delta_e$ are the slopes of the actual and excess channels at tap 1. Ideally, these time-variations would be canceled along with the excess channel. Hence, the constraints on the time-filter co-efticients can be summarized as:

$$\text{Cancel excess channel:} \quad \sum_{n=-N_f}^{N_b-1} (-1)^n \alpha_n = 0 \quad \text{(Equation 10)}$$

$$\text{Cancel variation } \delta_a: \quad \sum_{n=-N_f}^{N_b-1} n\alpha_n = 0$$

$$\text{Cancel variation } \delta_e: \quad \sum_{n=-N_f}^{N_b-1} (-1)^n n\alpha_n = 0$$

Since these constraints are invariant to a scale factor in the co-efficients, a normalization constraint may be imposed. e.g. that the channel estimate be unbiased, which means $$\text{Unbiased channel estimate:} \quad \sum_{n=-N_f}^{N_b-1} \alpha_n = 1 \quad \text{(Equation 11)}$$

For example, given a three tap filter with one non-causal tap, i.e. $N_f=1$, $N_b=2$, and the constraints in Equation 10 and Equation 11, the solution is $\{0.25, 0.5, 0.25\}$. In the absence of excess channel taps, the optimal solution would be $\{0.33, 0.33, 0.33\}$.

When the number of coefficients is greater than the number of linearly independent constraints, the coefficients can be chosen to minimize the noise variance in the time-filtered estimate, i.e., $$\text{Minimize} \sum_{n=-N_f}^{N_b-1} \alpha_n^2$$

under the constraints of Equation 10 and Equation 11. It would be apparent to those skilled in the art that since the constraints are linear and the objective function is quadratic, this optimization can be solved using Lagrange multiplier techniques.

Time-Filtering for the Excess Channel

Thus far, selection of filter taps has been restricted to the first P taps. For $l \geq P$, the taps correspond to the excess channel, and are denoted by $\{\beta_n\}$.

In choosing $\{\beta_n\}$, the goal is reversed from that for l<P, since only the excess taps are kept and contributions from the first P taps are eliminated. Hence, the constraints in Equation 10 are modified as:

$$\text{Cancel actual channel:} \quad \sum_{n=-N_f}^{N_b-1} \beta_n = 0$$

$$\text{Cancel variation } \delta_a: \quad \sum_{n=-N_f}^{N_b-1} n\beta_n = 0$$

$$\text{Cancel variation } \delta_e: \quad \sum_{n=-N_f}^{N_b-1} (-1)^n n\beta_n = 0$$

Only the first constraint has changed, and a scale factor constraint as in Equation 11 can be imposed. For the three tap non-causal filter, the solution for $\{\beta_{-1}, \beta_0, \beta_1\}$ is $\{-0.25, 0.5, -0.25\}$. It would be apparent to those skilled in the art that similar solutions can be obtained for other filter lengths (and other staggering patterns) as well.

Efficient Generation of Frequency Domain Estimate

In a modem implementation, the channel estimate in the frequency domain is finally obtained on a per-interlace basis. That is, to reduce the number of computations involved in the FFT operation to get the channel estimates in the frequency domain, a P pt FFT is performed on the time domain channel estimate (after introducing a suitable phase ramp), thereby resulting in the channel estimates for the interlace of interest. With the estimation of the channel taps corresponding to the excess delay in the channel, there are 2P taps for the channel estimate in the time domain. A channel estimate for the required interlace can be obtained with a single P pt FFT operation. In particular, let the 2P channel taps in the time domain be represented by $h=[h_a h_e]$ where $h_a$ and $h_e$ are each P length vectors. Given the frequency estimate for the P subcarriers (d=0,1,2 ... P−1) corresponding to the interlace m (m=0,1, ... 7), then the frequency domain channel estimate for the $d^{th}$ carrier in $m^{th}$ interlace is given by $$H_{m,d}(k) = \sum_{l=0}^{P-1} \left[ h_{a,l}(k) + h_{e,l}(k) e^{\frac{-j2\pi m}{8}} \right] e^{\frac{-j2\pi lm}{N}} e^{\frac{-j2\pi ld}{P}}.$$

The extra P taps of the channel result in some trivial complex multiplications (in four out of eight values of m) and additions. The phase ramp operation followed by the P pt FFT would have been performed irrespective of the number of channel taps being P. However, not truncating the channel to P taps, thereby allowing the extra P taps, requires additional memory for the buffering purposes.

Several assumptions and imposed limitations in the above discussion were made for the sake of illustration. Specifically, Staggering pattern: A simplistic staggering pattern with just two phases (0 and 4) was assumed. It would be apparent to those skilled in the art that the disclosed embodiments generalize to any other staggering pattern across different OFDM symbols. In each symbol, the pilots are uniformly spaced so that the excess channel aliases in the time-domain. The choice of the staggering pattern could be based on other factors and is of interest in itself.

Least-squares criterion: In going from the pilots in the frequency domain to the aliased time domain channel estimate, a least-squares approach is used, which translates to an IFFT. It would be apparent to those skilled in the art that other criteria for deriving the time-domain estimate are possible, e.g. an MMSE approach.

A key point here is the relationship between the time-domain channel and pilot observations that is induced by staggering. See Equation 7.

Time-filter length: A three tap filter for illustration was assumed. Clearly, the approach is applicable for any number of taps that is greater than two, and the filter can total number of pilot observations is greater than the total channel length assumed, otherwise, perfect estimation of the complete channel is not possible.

Filter co-efficient selection: In choosing the filter co-efficients in accordance with an embodiment, it is assumed that the same set of coefficients are used for all the taps in the actual channel, and a different set is used for all the taps in the excess channel. In another embodiment, a different set of coefficients is used for each tap in the actual channel as well as each tap in the excess channel (resulting in 2P sets of filter coefficients in the example). Additional constraints have been imposed that the time-variation of the channel must be cancelled or suppressed when choosing the co-efficients. These constraints can be released depending on the number of time-filter co-efficients or other system design requirements.

Linear variation model: Finally, in formulating the constraints in Equation 10 etc, a model has been used where the channel varies linearly over the duration of interest. Other approaches can be used to derive the constraints, e.g. a statistical model can be assumed for the channel correlation over time and the problem can be posed in terms of minimizing the variance of the time-variation errors.

For clarity, the pilot transmission and channel estimation techniques have been described for an OFDM system. These techniques may be used for other multi-carrier modulation techniques such as discrete multi tone (DMT).

Figure 4:
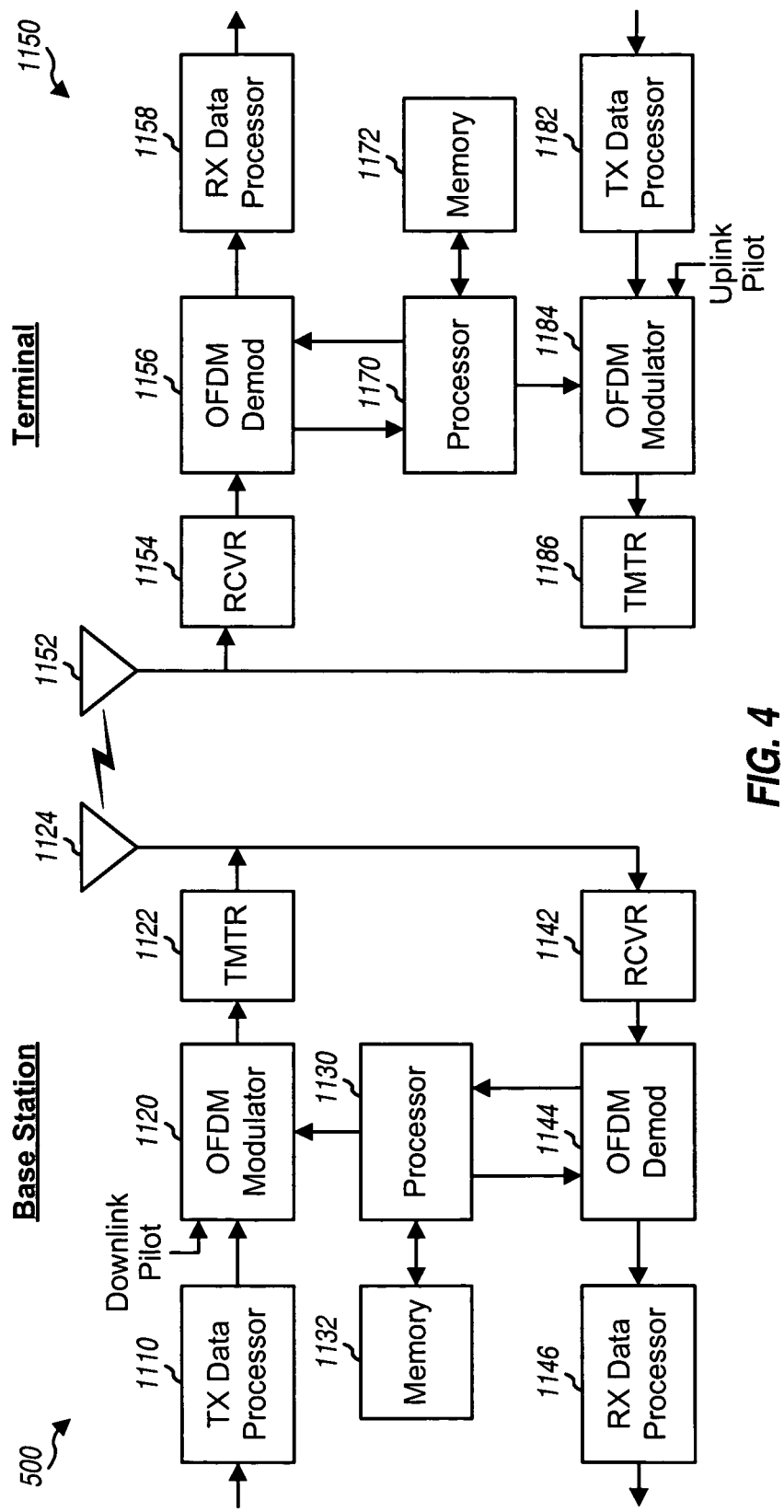
FIG. 4 shows an access point and a terminal in the OFDM system.

FIG. 4 shows a block diagram of an access point 1100 and a terminal 1150 in the OFDM system. On the downlink, at access point 1100, a transmit (TX) data processor 1110 receives, formats, codes, interleaves, and modulates (i.e., symbol maps) traffic data and provides modulation symbols (or simply, "data symbols"). An OFDM modulator 1120 receives the data symbols and pilot symbols, performs OFDM modulation as described for FIG. 1, and provides a stream of OFDM symbols. Pilot symbols are transmitted in a staggered manner. A transmitter unit (TMTR) 1122 receives and converts the stream of OFDM symbols into one or more analog signals, conditions (e.g., amplifies, filters, and frequency upconverts) the analog signals to generate a downlink signal, and transmits the signal via an antenna 1124 to the terminals.

At terminal 1150, an antenna 1152 receives the downlink signal and provides a received signal to a receiver unit (RCVR) 1154. Receiver unit 1154 conditions (e.g., filters, amplifies, and frequency downconverts) the received signal, digitizes the conditioned signal, and provides received chips to an OFDM demodulator 1156.

Figure 5:
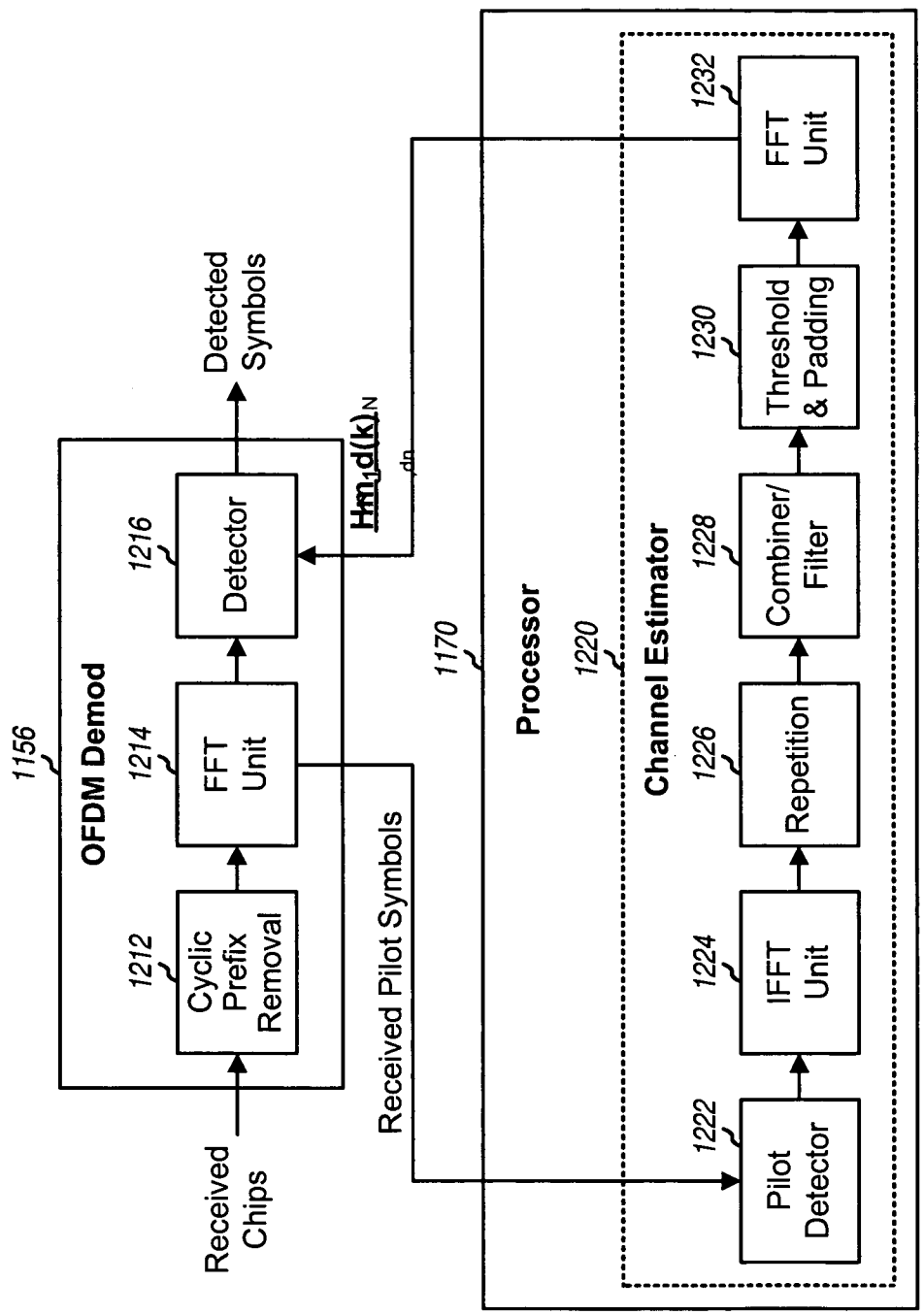
FIG. 5 shows a channel estimator.

FIG. 5 shows an embodiment of OFDM demodulator 1156. A cyclic prefix removal unit 1212 removes the cyclic prefix appended to each OFDM symbol. An FFT unit 1214 then transforms each received transformed symbol to the frequency domain using an $N_F$-point FFT and obtains $N_F$ received symbols for the $N_F$ subbands. FFT unit 1214 provides received pilot symbols to a processor 1170 and received data symbols to a detector 1216. Detector 1216 further receives a frequency response estimate $H_{m,d(k)}$ for the downlink from processor 1170, performs detection on the received data symbols to obtain detected symbols (which are estimates of the transmitted data symbols), and provides the detected symbols to an RX data processor 1158.

Processor 1170 includes a channel estimator 1220 that obtains the received pilot symbols and performs channel estimation as described above. Within channel estimator 1220, a pilot detector 1222 removes the modulation on the received pilot symbols and may perform extrapolation and/or interpolation as necessary to obtain an initial frequency response estimate $\hat{H}_{p,dn}$ with channel gain estimates for $N_{dn}$ uniformly distributed subbands in each OFDM symbol period. An IFFT unit 1224 performs an IFFT on the initial frequency response estimate to obtain a channel impulse response estimate $\hat{h}_{N_{dn},dn}$ with $N_{dn}$ taps. A repetition unit 1226 repeats the channel impulse response estimate as many times as necessary and further adjusts the phase of each instance if needed. A combiner/filter 1228 then either combines or filters the output of unit 1226 and provides a full channel impulse response estimate. A threshold and zero-padding unit 1230 performs thresholding (if enabled) and zero-padding to obtain a vector $\hat{h}_{N_F,dn}$ with $N_F$ taps. An FFT unit 1232 then performs an FFT on the vector $\hat{h}_{N_F,dn}$ to obtain the final frequency response estimate $\hat{H}_{N_F,dn}$ for the $N_F$ subbands for the downlink.

RX data processor 1158 demodulates (i.e., symbol demaps), deinterleaves, and decodes the detected symbols to recover the transmitted traffic data. The processing by OFDM demodulator 1156 and RX data processor 1158 is complementary to the processing by OFDM modulator 1120 and TX data processor 1110, respectively, at access point 1100.

On the uplink, a TX data processor 1182 processes traffic data and provides data symbols. An OFDM modulator 1184 receives and multiplexes the data symbols with pilot symbols, performs OFDM modulation, and provides a stream of OFDM symbols. The pilot symbols may be transmitted on $N_{up}$ subbands that have been assigned to terminal 1150 for pilot transmission. The number of pilot subbands ($N_{up}$) for the uplink may be the same or different from the number of pilot subbands ($N_{dn}$) for the downlink. Moreover, the same or different (e.g., staggering) pilot transmission schemes may be used for the downlink and uplink. A transmitter unit 1186 then receives and processes the stream of OFDM symbols to generate an uplink signal, which is transmitted via an antenna 1152 to the access point.

At access point 1100, the uplink signal from terminal 1150 is received by antenna 1124 and processed by a receiver unit 1142 to obtain received chips. An OFDM demodulator 1144 then processes the received chips and provides received pilot symbols and detected symbols for the uplink. An RX data processor 1146 processes the detected symbols to recover the traffic data transmitted by terminal 1150.

Processor 1130 performs channel estimation for each terminal transmitting on the uplink, as described above. Multiple terminals may transmit pilot concurrently on the uplink on their assigned pilot subbands. To reduce interference, each subband may be used for pilot or data transmission by only one terminal in a given OFDM symbol period. Processor 1130 may implement channel estimator 1220 shown in FIG. 5. For each terminal m, processor 1130 obtains an initial frequency response estimate $\hat{H}_m$ for the uplink for the terminal based on pilot symbols received from the terminal, derives a channel impulse response estimate $\hat{h}_{N_{up},m}$ for the terminal based on $\hat{H}_m$, and derives a final frequency response estimate $\hat{H}_{N_F,m}$ for the terminal based on $\hat{h}_{N_{up},m}$. The frequency response estimate $\hat{H}_{N_F,m}$ for each terminal is provided to OFDM demodulator 1144 and used for detection for that terminal.

Processors 1130 and 1170 direct the operation at access point 1100 and terminal 1150, respectively. Memory units 1132 and 1172 store program codes and data used by processors 1130 and 1170, respectively. Processors 1130 and 1170 also perform channel estimation as described above.

For clarity, the pilot transmission and channel estimation techniques have been described for an OFDM system. These techniques may be used for other multi-carrier modulation techniques such as discrete multi tone (DMT).

For a software implementation, the pilot transmission and channel estimation techniques may be implemented with modules (e.g., procedures, functions, and so on) that perform the functions described herein. The software codes may be stored in a memory unit (e.g., memory units 1132 and 1172 in FIG. 4) and executed by a processor (e.g., processors 1130 and 1170). The memory unit may be implemented within the processor or external to the processor, in which case it can be communicatively coupled to the processor via various means as is known in the art.

The pilot transmission and channel estimation techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

Figure 6:
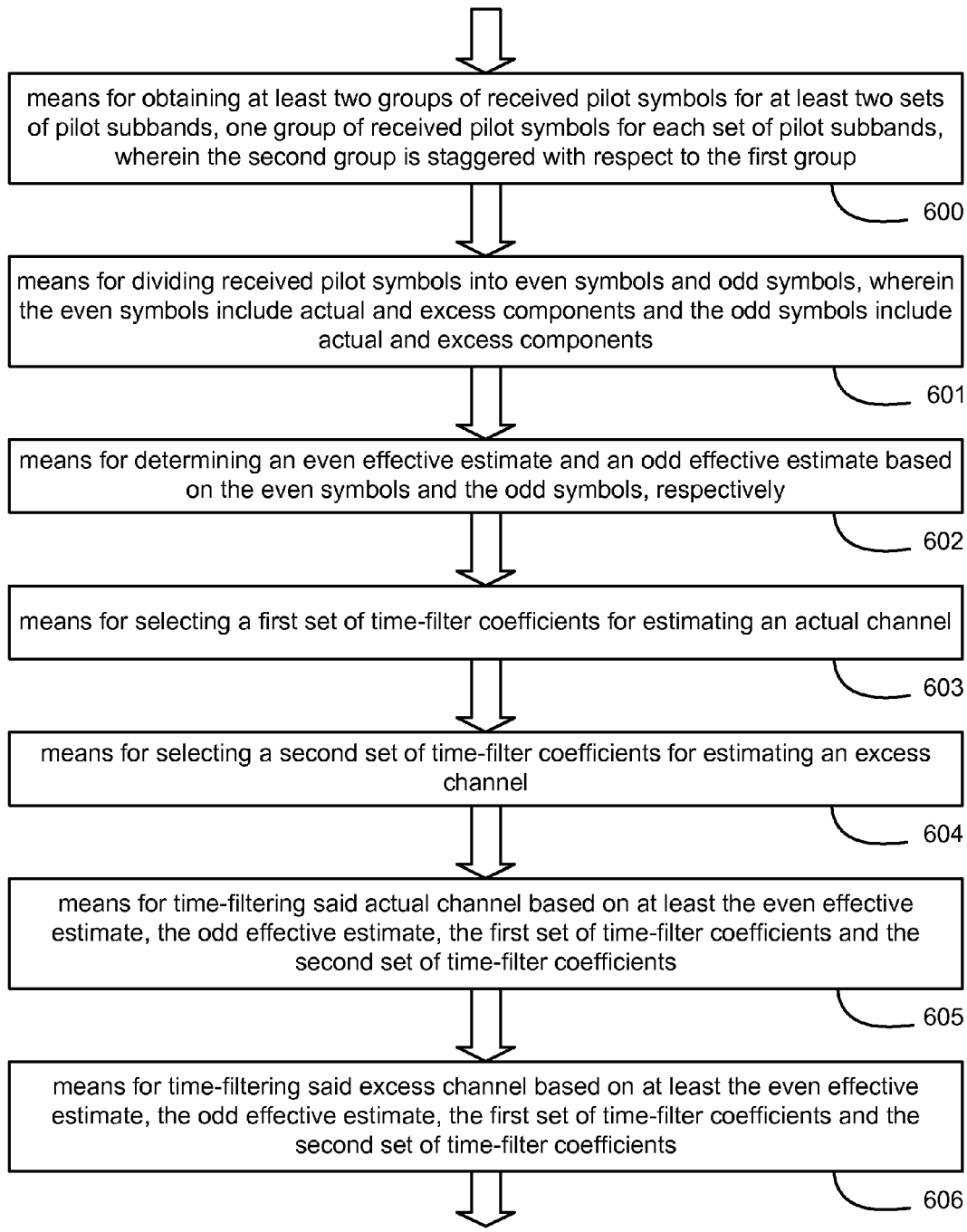
FIG. 6 shows a terminal.

FIG. 6 shows a terminal in a wireless communication system. The terminal includes means for obtaining at least two groups of received pilot symbols for at least two sets of pilot subbands, one group of received pilot symbols for each set of pilot subbands, wherein the second group is staggered with respect to the first group (600); means for dividing received pilot symbols into even symbols and odd symbols, wherein the even symbols include actual and excess components and the odd symbols include actual and excess components (601); means for determining an even effective estimate and an odd effective estimate based on the even symbols and the odd symbols, respectively (602); means for selecting a first set of time-filter coefficients for estimating an actual channel (603); means for selecting a second set of time-filter coefficients for estimating an excess channel (604); means for time-filtering said actual channel based on at least the even effective estimate, the odd effective estimate, the first set of time-filter coefficients and the second set of time-filter coefficients (605); and means for time-filtering said excess channel based on at least the even effective estimate, the odd effective estimate, the first set of time-filter coefficients and the second set of time-filter coefficients (606).

Figure 7:
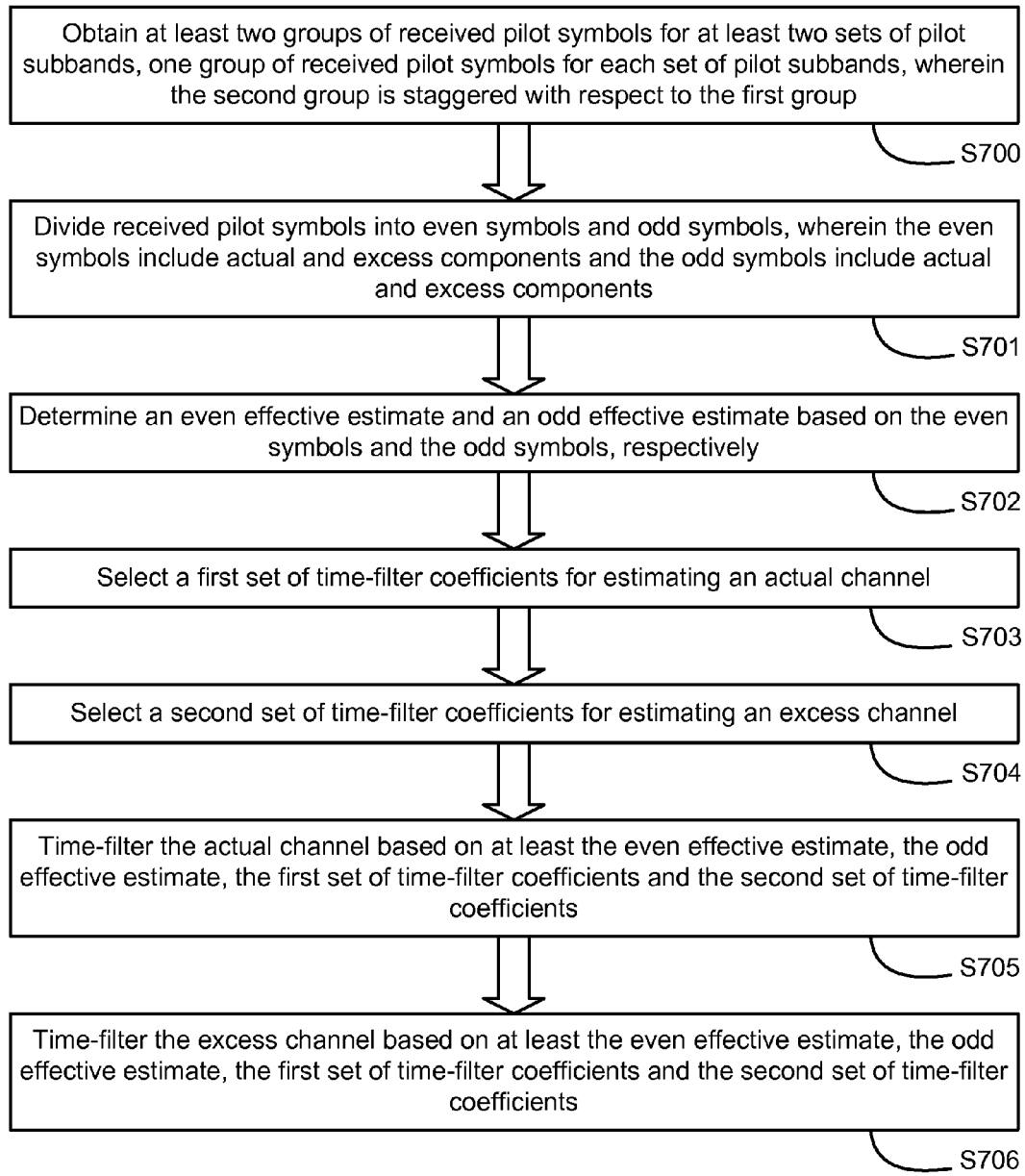
FIG. 7 shows a flowchart for a method of estimating a channel in a wireless communication system.

FIG. 7 shows a flowchart of a method for estimating a channel in a wireless communication system. The method includes step S700 to obtain at least two groups of received pilot symbols for at least two sets of pilot subbands, one group of received pilot symbols for each set of pilot subbands, wherein the second group is staggered with respect to the first group; step S701 to divide received pilot symbols into even symbols and odd symbols, wherein the even symbols include actual and excess components and the odd symbols include actual and excess components; step S702 to determine an even effective estimate and an odd effective estimate based on the even symbols and the odd symbols, respectively; step S703 to select a first set of time-filter coefficients for estimating an actual channel; step S704 to select a second set of time-filter coefficients for estimating an excess channel; step S705 to time-filter said actual channel based on at least the even effective estimate, the odd effective estimate, the first set of time-filter coefficients and the second set of time-filter coefficients; and step S706 to time-filter said excess channel based on at least the even effective estimate, the odd effective estimate, the first set of time-filter coefficients and the second set of time-filter coefficients.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of estimating a channel in a wireless communication system, the method comprising:
    obtaining, by a processor, at least two groups of received pilot symbols for at least two sets of pilot subbands, one group of said received pilot symbols for each set of pilot subbands, wherein the second group is staggered with respect to the first group;
    dividing said received pilot symbols into even symbols and odd symbols, wherein the even symbols include actual and excess components and the odd symbols include actual and excess components;
    determining an even effective estimate and an odd effective estimate based on the even symbols and the odd symbols, respectively;
    selecting a first set of time-filter coefficients for estimating an actual channel;
    selecting a second set of time-filter coefficients for estimating an excess channel;
    estimating said actual channel based on at least the even effective estimate, the odd effective estimate, the first set of time-filter coefficients and the second set of time-filter coefficients; and
    estimating said excess channel based on at least the even effective estimate, the odd effective estimate, the first set of time-filter coefficients and the second set of time-filter coefficients,
    wherein said actual components include channel taps at or within a prefix length, and excess components include channel taps outside of the prefix length.

2. The method of claim 1, wherein said dividing further comprises uniformly spacing the received pilot symbols of the second group from the received pilot symbols of the first group.

3. The method of claim 2, wherein said dividing further comprises staggering the at least two groups of received pilot symbols according to a two symbol staggering pattern.

4. The method of claim 2, wherein said dividing further comprises staggering the at least two groups of received pilot symbols according to an n-symbol staggering pattern.

5. An apparatus for estimating a channel in a wireless communication system, the apparatus comprising:
    a memory unit containing program code; and
    a processor configured to execute the program code to:
        obtain at least two groups of received pilot symbols for at least two sets of pilot subbands, one group of received pilot symbols for each set of pilot subbands, wherein the second group is staggered with respect to the first group;

divide said received pilot symbols into even symbols and odd symbols, wherein the even symbols include actual and excess components and the odd symbols include actual and excess components;

determine an even effective estimate and an odd effective estimate based on the even symbols and the odd symbols, respectively;

select a first set of time-filter coefficients for estimating an actual channel;

select a second set of time-filter coefficients for estimating an excess channel;

time-filter said actual channel based on at least the even effective estimate, the odd effective estimate, the first set of time-filter coefficients and the second set of time-filter coefficients; and time-filter said excess channel based on at least the even effective estimate, the odd effective estimate, the first set of time-filter coefficients and the second set of time-filter coefficients, wherein said actual components include data at or within a prefix length, and excess components include data outside of the prefix length.

6. The apparatus of claim 5, wherein said processor configured to execute the program code to divide further comprises said processor configured to execute the program code to uniformly space the received pilot symbols of the second group from the received pilot symbols of the first group.

7. The apparatus of claim 6, wherein said processor configured to execute the program code to divide further comprises said processor configured to execute the program code to stagger the at least two groups of received pilot symbols according to a two symbol staggering pattern.

8. The apparatus of claim 6, wherein said processor configured to execute the program code to divide further comprises said processor configured to execute the program code to stagger the at least two groups of received pilot symbols according to an n-symbol staggering pattern.

9. A communication signal demodulating apparatus comprising:

an OFDM demodulator configured to receive data comprising a plurality of symbols, the plurality of symbols comprising pilot symbols and data symbols, the OFDM demodulator comprising:

a cyclic prefix removal unit for removing a cyclic prefix appended to said plurality of symbols;

a Fast Fourier Transform unit for transforming said plurality of symbols into the frequency domain; and a detector; and a processor configured to receive said pilot symbols from the Fast Fourier Transform unit and perform channel estimation on said received pilot symbols by dividing said received pilot symbols into even symbols and odd symbols, wherein the even symbols include actual and excess components and the odd symbols include actual and excess components, and determining an even effective estimate and an odd effective estimate based on the even symbols and the odd symbols, respectively, the processor further configured to determine at least one frequency response value based on the even effective estimate and the odd effective estimate, wherein the detector is configured to receive said data symbols from the Fast Fourier Transform unit and the at least one frequency response value from the processor to obtain estimates of transmitted data symbols and provide detected symbols, and wherein said actual components include data at or within a prefix length, and said excess components include data outside of the prefix length.

10. The communication signal demodulation apparatus of claim 9, wherein the processor comprises a channel estimator configured to receive pilot symbols and perform channel estimation.

11. The communication signal demodulating apparatus of claim 10, wherein the channel estimator comprises a pilot detector having an output operably connected to an input of an inverse Fast Fourier Transform unit having an output operably connected to an input of a repetition processor having an output operably connected to an input of a combiner/filter having an output operably connected to an input of a threshold and padding processor having an output operably connected to an input of an estimator Fast Fourier Transform unit.

12. The communication signal demodulating apparatus of claim 10, wherein the channel estimator comprises a pilot detector for removing modulation on said received pilot signals and for obtaining an initial frequency response estimate, an inverse Fast Fourier Transform unit for performing an inverse Fast Fourier Transform on the initial frequency response estimate to obtain a channel impulse response estimate, a repetition processor for repeating the channel impulse response estimate, a combiner/filter for performing at least one of combining or filtering the channel impulse response estimate to provide a full channel impulse response estimate, a threshold and padding processor for performing at least one of thresholding or zero-padding to obtain a vector, and an estimator Fast Fourier Transform unit for performing a Fast Fourier Transform on the vector to obtain a final frequency response estimate.

13. The communication signal demodulating apparatus of claim 10, wherein the channel estimator is configured to employ time filtering techniques to address delay spread effects.

14. The communication signal demodulating apparatus of claim 9, wherein the dividing further comprises uniformly spacing the received pilot symbols of the second group from the received pilot symbols of the first group.

15. The communication signal demodulating apparatus of claim 14, wherein the dividing further comprises staggering the at least two groups of received pilot symbols according to a two symbol staggering pattern.

16. The communication signal demodulating apparatus of claim 14, wherein the dividing further comprises staggering the at least two groups of received pilot symbols according to an n-symbol staggering pattern.

17. A non-transitory computer readable medium embodying instructions, which when executed by one or more processors, perform a method comprising:

obtaining at least two groups of received pilot symbols for at least two sets of pilot subbands, one group of said received pilot symbols for each set of pilot subbands, wherein the second group is staggered with respect to the first group;

dividing said received pilot symbols into at least two groups, even symbols and odd symbols, wherein the even symbols include actual and excess components and the odd symbols include actual and excess components;

determining an even effective estimate and an odd effective estimate based on the even symbols and the odd symbols, respectively;

selecting a first set of time-filter coefficients for estimating an actual channel;

selecting a second set of time-filter coefficients for estimating an excess channel;

estimating said actual channel based on at least the even effective estimate, the odd effective estimate, the first set of time-filter coefficients and the second set of time-filter coefficients; and estimating said excess channel based on at least the even effective estimate, the odd effective estimate, the first set of time-filter coefficients and the second set of time-filter coefficients, wherein said actual components include channel taps at or within a prefix length, and said excess components include channel taps outside of the prefix length.

18. The computer readable media of claim 17, wherein said dividing further comprises uniformly spacing the received pilot symbols of the second group from the received pilot symbols of the first group.

19. The computer readable media of claim 18, wherein dividing further comprises staggering the at least two groups of received pilot symbols according to a two symbol staggering pattern.

20. The computer readable media of claim 18, wherein dividing further comprises staggering the at least two groups of received pilot symbols according to an n-symbol staggering pattern.

\* \* \* \* \*